2,905,525
METHOD OF SEPARATION OF PLUTONIUM FROM CARRIER PRECIPITATES

Lyle R. Dawson, Lexington, Ky., assignor to the United States of America as represented by the United States Atomic Energy Commission No Drawing. Application June 9, 1949
Serial No. 98,177

13 Claims. (Cl. 23—14.5)

This invention deals with the separation of plutonium from aqueous solutions, and in particular from aqueous solutions obtained by dissolving carrier precipitates containing plutonium.

In most cases, plutonium is obtained in such small quantities and the solutions containing it have such a high degree of dilution that the plutonium content thereof is within the limits of solubility; this makes the precipitation of the plutonium per se impossible. For this reason, plutonium has been recovered from its dilute solutions by adding a salt and then precipitating the cations of the salt; the precipitate obtained then carries the plutonium. Such mixtures of plutonium and precipitate compounds will be henceforth referred to as "carrier precipitate." A few examples for carrier materials found suitable and used heretofore are lanthanum fluoride, strontium fluoride, bismuth phosphate, and zirconium phenyl-arsonate.

It is an object of this invention to separate plutonium from such carrier precipitates as defined above and thereby quantitatively to recover the plutonium contained therein.

This and other objects are accomplished by dissolving the carrier precipitate in an aqueous medium, contacting said aqueous solution with an organic, substantially water-immiscible solvent whereby two distinct phases are formed and plutonium is extracted by said organic solvent, and thereafter separating the two phases.

Various kinds of aqueous liquids may be used for dissolving the carrier precipitate; for instance, mineral acids, such as dilute nitric acid and sulfuric acid have been found suitable. In the case that the carrier is a fluoride, e.g., lanthanum fluoride or strontium fluoride, dissolving of the carrier precipitate with a complexing agent for the fluoride anion has been particularly successful. For instance, the use of aqueous solutions of zirconyl nitrate, ferric nitrate, and aluminum nitrate yielded very satisfactory results. In the case of, for example, zirconyl nitrate, the fluorine was complexed in the form of a fluozirconate. While only small quantities of the complexing agent are necessary and, for instance, a ratio of zirconium to lanthanum of as low as 0.6 has been found satisfactory, a ratio of approximately 3 is preferred.

Prior to the addition of the extracting solvent, it is advisable to acidify the solution and to add a salting-out agent whereby the distribution coefficient is increased in favor of the solvent phase. The effect of acid concentration on the distribution coefficient has been studied with regard to nitric acid; these studies show that the distribution coefficient is increased in favor of the organic solvent phase with increasing acid concentration. However, excellent results were already obtained with an acid concentration of from 1 to 3 M.

Likewise, the distribution coefficient of the plutonium was found to increase with increasing salting-out agent concentration. In the case of ammonium nitrate as the salting-out agent, concentrations up to 10 M were found suitable. However, a concentration of around 5 M ammonium nitrate was preferred, because at higher concentrations the nitrate tended to crystallize.

Various types of salting-out agents have been found suitable. Thus, a highly water-soluble nitrate or chloride and nitric acid or hydrochloric acid have been used. Other inorganic salts that are very soluble in water have been found to be suitable as the salting-out agent. It is preferred, though, to employ one, or a mixture of any, of the following nitrates: sodium nitrate, calcium nitrate, potassium nitrate, strontium nitrate, lithium nitrate, magnesium nitrate, ammonium nitrate, lanthanum nitrate, manganese nitrate, and aluminum nitrate. In the case of bismuth phosphate-plutonium phosphate carrier precipitate, ammonium sulfate has been found to have good salting-out qualities. As an example of one of the many solutions found especially satisfactory for the extraction process of this invention, the following composition is given: 5 M ammonium nitrate, 3 M nitric acid, 6.2 g. lanthanum/l., 18.6 g. zirconium/l., and 1.37 g. plutonium/l.

The extraction agents which are suitable for use in this process comprise normally liquid organic solvents which are substantially immiscible with the aqueous solution to be extracted and which contain at least one atom capable of donating an electron pair to a coordination bond. Such solvents suitably comprise water-immiscible organic compounds containing an oxygen or a sulfur electron-donor atom. Most organic solvents containing oxygen or sulfur donor atoms may be used for the extraction of acidic aqueous solutions as well as neutral solutions, the oxygenated organic solvents being the preferred extractants for use in the present process.

Although most normally liquid organic compounds containing an atom with excess electrons, such as oxygen and sulfur, are capable of forming a coordination bond, it will be evident to those skilled in the art that certain molecular structures can reduce this electron-donating property. Electron-attracting constituents, such as halogen atoms, can reduce the electron-donating property of an atom such as oxygen, if present in sufficient number and corresponding relationship to the donor atom. For this reason, it is preferable to employ compounds containing only carbon, hydrogen and electron-donor atoms. It will also be apparent that certain molecular configurations can give rise to steric hindrance which may interfere sufficiently to prevent the formation of coordination bonds. Tertiary carbon atoms adjacent an electron-donor atom and long chains of non-donor atoms linked to a donor atom are especially undesirable in this respect. The preferred solvents are those in which the donor atom is linked to a hydrogen atom or to non-tertiary carbon atoms and in which at least one component linked to the donor atom contains less than four consecutive non-donor atoms. Thus, broadly, ethers, esters, ketones, alcohols, sulfides, polyglycol ethers, nitrohydrocarbons and alkylated phosphates are preferred.

The following are examples of suitable specific solvents for use in the present process.

Diethyl ether
Bis-β-chloroethyl ether
2-phenoxyethanol
2-benzyloxyethanol
2-(β-ethylbutoxy) ethanol
1,2-diethoxyethane
1-ethoxy-2-butoxyethane
1,2-dibutoxyethane
Bis-β-butoxyethyl ether
1,2-bis-(β-chloroethoxy) ethane
5,8,11,14,17-pentoxaheneicosane
o-nitroanisole
2,6-dimethyl-1,4-dioxane
1-oxa-2,5-dimethylcyclopentane
Ethyl sulfide Hexanol
Heptanol
Heptadecanol
2-ethylbutanol
Methylisobutylcarbinol
Methyl ethyl ketone
Methyl amyl ketone
Methyl isobutyl ketone (also called hexone)
Mesityl oxide
Acetophenone
Cyclopentanone
Cyclohexanone
4-methylcyclohexanone
Menthone
Isophorone
Nitromethane
Nitroethane
1-nitropropane
Nitrobenzene
Tributyl phosphate
Dioctyl hydrogen phosphate
Trihexyl phosphate
Octadecyl dihydrogen phosphate
Didodecyl phenylphosphonate
Dihexyl phenylphosphonate These solvents extract both tetravalent and hexavalent plutonium; however, in the case of diethyl ether, especially, it is preferred to oxidize plutonium to the hexavalent state before the extraction. Suitable oxidation agents for this purpose are potassium permanganate, sodium bromate, sodium bismuthate, red lead oxide, and potassium dichromate. If potassium permanganate is used, it is advisable to avoid an excess thereof, because otherwise manganese dioxide may occur in suspended form in the ether layer.

While the two phases formed, namely, the aqueous phase and the solvent phase, may be separated by any means known to those skilled in the art, it is preferable to carry out the separation in an extraction column. In the case of batch extraction, the aqueous phase has been separated from the solvent phase by freezing it. After separation of the two phases, the plutonium contained in the organic solvent may be re-extracted with water. This re-extraction step proceeds equally well with hexavalent, tetravalent, or trivalent plutonium. In the case of hexavalent plutonium, it has been found advisable to reduce it, preferably, to the trivalent state; examples of suitable reducing agents are hydrogen peroxide, hydroxylamine hydrochloride, ferrous chloride, and stannous chloride. Hydrogen peroxide reduces plutonium to the tetravalent state. This intermediate step reduces the quantity of water necessary for re-extraction. However, no further advantage being encountered in the reduction of the plutonium, this step of re-extraction is usually carried out without the use of any prior reducing step.

The aqueous plutonium solution thus obtained may then be evaporated for the recovery of the plutonium, or else the plutonium may be precipitated by means of an alkali hydroxide, such as ammonium hydroxide, potassium hydroxide, or sodium hydroxide.

In the following example, one embodiment of the invention is described for the purpose of illustration only and not with the intent to have the invention limited to the details.

Example

A carrier precipitate consisting of lanthanum fluoride and plutonium fluoride was suspended in 2 N nitric acid, and the mixture was heated to near its boiling point. Ferric nitrate and nitric acid were then added in quantities so as to yield a solution 5 M in ferric nitrate and 2 M in nitric acid, whereby the carrier precipitate was dissolved. The temperature of the solution was kept above 80° C. and just enough solid potassium permanganate was added to obtain a permanently pink color; by this, the tetravalent plutonium was oxidized to the hexavalent state. The solution was then allowed to cool, and enough solid ammonium nitrate was added to the solution to obtain an ammonium nitrate solution of 10 M. The solution was then shaken with from 2 to 3 times its volume of diethyl ether whereby most of the plutonium went into the ether phase. The mixture of the two phases was then chilled to freeze the aqueous phase and the solid aqueous crystals were thereupon easily separated. In the instant case, the solvent phase was poured off onto dilute hydrochloric acid whereby the plutonium was taken up by the aqueous hydrochloric acid solution. This fractionating cycle, consisting of freezing and separating, was then repeated twice in order to complete the separation of plutonium. Thereafter, the hexavalent plutonium, contained in the aqueous hydrochloric acid solutions of the three re-extraction cycles, was reduced to the tetravalent state by means of hydrogen peroxide and then precipitated by means of ammonium hydroxide. By this process, a plutonium recovery of from 85 to 96% was obtained.

The process of this invention may be effected by the use of batch, continuous batch, batch countercurrent, or continuous countercurrent methods.

It will be understood that while there have been described herein certain specific embodiments of the invention, it is not intended thereby to have the invention limited to the details given in view of the fact that the invention is susceptible to various modifications and changes which come within the spirit of the disclosure and the scope of the appended claims.

What is claimed is:

1. A process for separating plutonium from fluoride carrier precipitates, comprising dissolving said precipitates in an aqueous zirconyl nitrate solution, contacting the solution obtained with a substantially water-immiscible organic solvent whereby a solvent phase containing the bulk of the plutonium and an aqueous phase are formed, and then separating said two phases.

2. A process for separating plutonium from fluoride carrier precipitates, comprising dissolving said precipitates in an aqueous zirconyl nitrate solution, adding a salting-out agent, contacting the solution obtained with a substantially water-immiscible organic solvent whereby a solvent phase containing the bulk of the plutonium and an aqueous phase are formed, and then separating said two phases.

3. A process for separating plutonium from fluoride carrier precipitates, comprising dissolving said precipitate with a complexing agent for said fluoride anion selected from the group consisting of zirconyl nitrate, ferric nitrate, and aluminum nitrate and mixtures thereof, adding a salting-out agent, contacting the solution obtained with a substantially water-immiscible organic solvent whereby a solvent phase containing the bulk of the plutonium and an aqueous phase are formed, separating said two phases, and then re-extracting the plutonium from the solvent phase with water.

4. A process for separating plutonium from fluoride carrier precipitates, comprising dissolving said precipitate with a complexing agent for said fluoride anion selected from the group consisting of zirconyl nitrate, ferric nitrate, and aluminum nitrate and mixtures thereof adding a salting-out agent, contacting the solution obtained with a substantially water-immiscible organic solvent whereby a solvent phase containing the bulk of the plutonium and an aqueous phase are formed, separating said two phases, then re-extracting the plutonium from the solvent phase with water, and separating the plutonium from the aqueous solution.

5. A process for separating plutonium from fluoride carrier precipitates, comprising dissolving said precipitates with a complexing agent for said fluoride anion selected from the group consisting of zirconyl nitrate, ferric nitrate, and aluminum nitrate and mixtures thereof adding a salting-out agent, contacting the solution obtained with a substantially water-immiscible organic solvent whereby a solvent phase containing the bulk of the plutonium and an aqueous phase are formed, separating said two phases, re-extracting the plutonium from the solvent phase with water, and then evaporating water from the aqueous plutonium solution thus obtained.

6. A process for separating plutonium from fluoride carrier precipitates, comprising dissolving said precipitates with a complexing agent for said fluoride anion selected from the group consisting of zirconyl nitrate, ferric nitrate, and aluminum nitrate and mixtures thereof adding a salting-out agent, contacting the solution obtained with a substantially water-immiscible organic solvent whereby a solvent phase containing the bulk of the plutonium and an aqueous phase are formed, separating said two phases, re-extracting the plutonium from the solvent phase with water, and precipitating the plutonium from said aqueous solution by means of alkali hydroxide.

7. A process for separating plutonium from lanthanum fluoride carrier precipitates, comprising dissolving said precipitate by using an aqueous solution of a fluoride-complexing agent selected from the group consisting of zirconyl nitrate, ferric nitrate, and aluminum nitrate and mixtures thereof, adding a salting-out agent, contacting the solution obtained with a substantially water-immiscible organic solvent whereby a solvent phase containing the bulk of the plutonium and an aqueous phase are formed, separating said two phases, and then re-extracting the plutonium from the solvent phase with water.

8. A process for separating plutonium from fluoride carrier precipitates, comprising dissolving said precipitates with a complexing agent selected from the group consisting of zirconyl nitrate, ferric nitrate, aluminum nitrate and mixtures thereof, oxidizing the plutonium to its hexavalent state, adding a salting-out agent, contacting the solution thus obtained with diethyl ether whereby the plutonium is extracted by said ether in a separate solvent phase, and separating said ether phase from the aqueous solution.

9. A process for separating plutonium from fluoride carrier precipitates, comprising dissolving said precipitates in nitric acid and a complexing agent selected from the group consisting of zirconyl nitrate, ferric nitrate, aluminum nitrate and mixtures thereof, adding ammonium nitrate, contacting the solution obtained with a substantially water-immiscible organic solvent whereby a solvent phase containing the bulk of the plutonium and an aqueous phase are formed, separating said two phases, and then re-extracting said plutonium from said solvent phase by means of water.

10. A process for separating plutonium from fluoride carrier precipitates, comprising dissolving said precipitates in nitric acid and a complexing agent selected from the group consisting of zirconyl nitrate, ferric nitrate, aluminum nitrate and mixtures thereof, adding a nitrate to obtain it in a 5 M concentration, adjusting the nitric acid concentration to 2 M, contacting the solution obtained with a substantially water-immiscible organic solvent whereby a solvent phase containing the bulk of the plutonium and an aqueous phase are formed, separating said two phases, and then re-extracting said plutonium from said solvent phase by means of water.

11. A process for separating plutonium from fluoride carrier precipitates, comprising dissolving said precipitates in nitric acid and a complexing agent selected from the group consisting of zirconyl nitrate, ferric nitrate, aluminum nitrate and mixtures thereof, adding a nitrate to obtain it in a 5 M concentration, adjusting the nitric acid concentration to about 2 M, contacting the solution obtained with hexone whereby a solvent phase containing the bulk of the plutonium and an aqueous phase are formed, separating said two phases, and then re-extracting said plutonium from said solvent phase by means of water.

12. A process for separating plutonium from fluoride carrier precipitates, comprising dissolving said precipitates with a complexing agent selected from the group consisting of zirconyl nitrate, ferric nitrate, aluminum nitrate and mixtures thereof, adding a salting-out agent, contacting the solution obtained with a substantially water-immiscible organic solvent whereby a solvent phase containing the bulk of the plutonium and an aqueous phase are formed, cooling said phases until said aqueous phase is frozen, and then separating said frozen aqueous phase from said solvent phase.

13. A process for recovering plutonium from lanthanum fluoride-plutonium fluoride carrier precipitates, comprising suspending said precipitates in 2 M nitric acid; heating said solution to near boiling; adding an aqueous solution of ferric nitrate and nitric acid to obtain concentrations of 5 M and 2 M, respectively whereby said precipitate is dissolved; adding a substantially stoichiometric amount of potassium permanganate for the oxidation of plutonium to the hexavalent state while maintaining the temperature of said solution above 80° C.; allowing said solution to cool to room temperature; adding solid ammonium nitrate in a quantity so as to obtain a concentration of 10 M; contacting said aqueous solution with from 2 to 3 times its volume of diethyl ether; separating an ether phase from an aqueous phase; pouring said ether phase onto dilute mineral acid; adding hydrogen peroxide to the mineral acid plutonium solution whereby the plutonium is reduced to its tetravalent state; and precipitating the plutonium by means of ammonium hydroxide.

References Cited in the file of this patent
UNITED STATES PATENTS

| | | |
|---|---|---|
| 2,227,833 | Hixson et al. | Jan. 7, 1941 |
| 2,776,185 | Werner et al. | Jan. 1, 1957 |
| 2,811,415 | Seaborg | Oct. 29, 1957 |

OTHER REFERENCES

CN-2511, U.S. Atomic Energy Commission document dated December 30, 1944, declassified February 16, 1957, pp. 4–15, 37.